(12) United States Patent
Goto et al.

(10) Patent No.: US 6,686,554 B1
(45) Date of Patent: Feb. 3, 2004

(54) METHOD OF ELECTRODISCHARGE WIRE MACHINING

(75) Inventors: Akihiro Goto, Tokyo (JP); Toshio Moro, Tokyo (JP); Seiji Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/069,504

(22) PCT Filed: Jun. 28, 2000

(86) PCT No.: PCT/JP00/04253
§ 371 (c)(1),
(2), (4) Date: Feb. 27, 2002

(87) PCT Pub. No.: WO02/00383
PCT Pub. Date: Jan. 3, 2002

(51) Int. Cl.[7] ............................ B23H 7/02; B23H 7/36
(52) U.S. Cl. ............................ 219/69.12; 219/69.14
(58) Field of Search ........................ 219/69.12, 69.14

(56) References Cited

U.S. PATENT DOCUMENTS 4,578,556 A * 3/1986 Inoue ..................... 219/69.12
4,857,688 A * 8/1989 Aso et al. ................ 219/69.14

FOREIGN PATENT DOCUMENTS

JP        9-239622 A       9/1997

OTHER PUBLICATIONS

Concise statement for Japanese patent publication No. Hei. 9–239622.
"Attempt at microscopic machining by electric discharge in gas", Masahiro Yoshida & Masanori Kunieda, Articles for Lectures in 1996 National convention of Japan Society of Electrical–Machining Engineers.
"Improvement of Accuracy of Second–Cut using Dry WEDM", Yoshiro Adachi, Chika Furudate, & Masanori Kunieda, vol. 14. 7, pp. 154–155, Japan Society of Die and Mould Technology, published Jul. 1999.
"Effect of Mist supply in Second–Cut of Electric discharge in gas", Chika Furudate & Masanori Kunieda, Articles for Lectures in 1996 Autumn convention of Japan Society of Precision Engineering.

* cited by examiner

Primary Examiner—Geoffrey S. Evans
(74) Attorney, Agent, or Firm—Sughrue Mion, PLLC (57) ABSTRACT

A method of wire electric discharge machining by which an electric discharge is generated in a gap between a wire electrode (1a) and a workpiece (2) so that the workpiece (2) is machined, includes the steps of: a first step in which electric discharge machining is conducted in a dielectric liquid (4a); a second step in which electric discharge machining is conducted in mist (7); and a third step in which electric discharge machining is conducted in gas (8), such that the machining process is changed over when straightness of the workpiece (2) becomes a predetermined value. It is possible to provide a method of wire electric discharge machining, the productivity of which is high, suitable for highly accurate machining.

3 Claims, 10 Drawing Sheets

METHOD OF ELECTRODISCHARGE WIRE MACHINING

This application is a 371 of PCT/JP00/04253, filed Jun. 28, 2000, now WO 02/00383 A1.

TECHNICAL FIELD

The present invention relates to improvements in a method of wire electric discharge machining by which an electric discharge is generated in a gap between a wire electrode and a workpiece so that the workpiece is machined.

BACKGROUND ART

Electric discharge machining has been steadily used for machining metallic molds and others, that is, electric discharge machining has been widely used in the field of machining metallic molds in the automobile industry, electric appliance industry, semiconductor industry and so forth.

Figure 8:
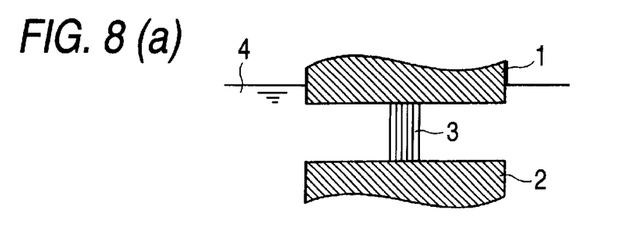
FIGS. 8(A) 8(B) 8(C) 8(D) and 8(E) are schematic illustrations for explaining a mechanism of electric discharge machining.

FIG. 8 is a schematic illustration for explaining a mechanism of electric discharge machining. In the drawing, reference numeral 1 is an electrode, reference numeral 2 is a workpiece, reference numeral 3 is an arc column, reference numeral 4 is a dielectric fluid, and reference numeral 5 represents chips created in the process of electric discharge machining. When the cycle including process (a) to process (e), which correspond to (a) to (e) shown in FIG. 8, is being repeated, electric discharge machining is conducted on the workpiece 2. That is, each process is conducted as follows.

(a) The arc column 3 is formed by the generation of electric discharge.

(b) The workpiece is partially melted by thermal energy of electric discharge and the dielectric fluid 4 is vaporized.

(c) A vaporizing explosion force of the dielectric fluid 4 is generated.

(d) A melting section (chips 5) is scattered, (e) Cooling, coagulation and recovery of insulation between the electrodes are executed by the dielectric fluid 4.

The present invention relates to wire electric discharge machining used for gouging or cutting. In the field of wire electric discharge machining, there is a strong demand of enhancing the dimensional accuracy. For example, when a metallic mold used in the field of semiconductor industry is machined, it is necessary to conduct machining with high accuracy of 1 to 2 μm.

Figure 9:
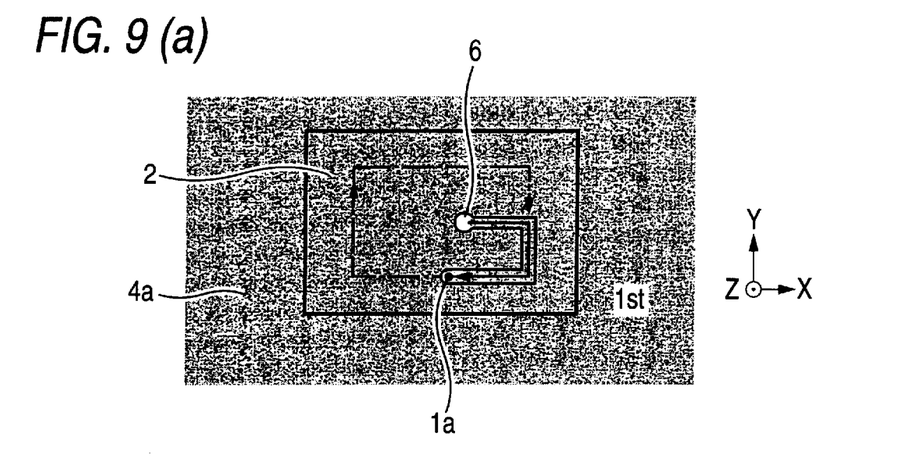
FIGS. 9(A) 9(B) and 9(C) are schematic illustrations showing a machining process of wire electric discharge machining.

FIG. 9 is a schematic illustration showing an example of the machining process of wire electric discharge machining. In the drawing, reference numeral 1a is a wire electrode, reference numeral 2 is a workpiece, reference numeral 4a is water which is used as a dielectric fluid, and reference numeral 6 is an initial hole. In FIG. 9, (a) is a view showing a circumstance of the first cut process in which rough machining is conducted, (b) is a view showing a circumstance of the second cut process in which intermediate machining is conducted after the rough machining, and (c) is a view showing a circumstance of the third cut process in which final machining is conducted.

In the example of the first cut process shown in (a) of FIG. 9, the wire electrode 1a is made to pass through the initial hole 6, and the workpiece 2 is gouged. In this case of the first cut process, the surface roughness and dimensional accuracy are finally finished in the process conducted later. Therefore, it is unnecessary to machine the workpiece with such a severe surface roughness and high dimensional accuracy in the process of first cut, but it is important to increase a rate of machining so as to enhance the productivity. In order to increase the rate of machining of wire electric discharge machining, water 4a is strongly sprayed to between the electrodes so that chips can be effectively ejected from between the electrodes. In order to uniformly spray water to between the electrodes and in order to prevent the breaking of wire of the wire electrode 1a, a method is used in which water 4a is stored in a processing tank not shown and the workpiece 2 is dipped in the processing tank.

According to the above conventional method of wire electric discharge machining, the second cut ((b) in FIG. 9) and the third cut ((c) in FIG. 9), which are conducted after the first cut ((a) in FIG. 9), are also conducted in water 4a which is a dielectric fluid.

Figure 10:
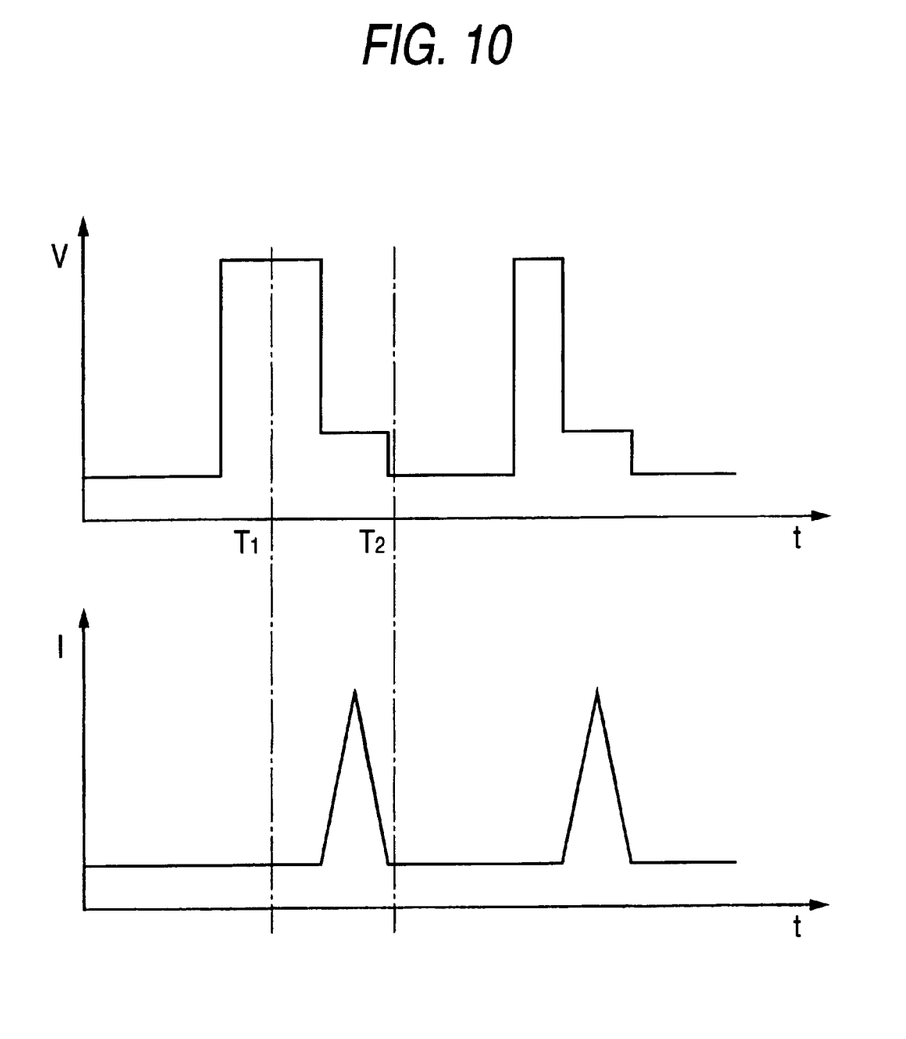
FIG. 10 is a view showing an example of wave-forms of voltage and current impressed between electrodes.

FIG. 10 is a graph showing an example of the wave-form of voltage and the wave-form of a current between the electrodes. In the graph, V is a voltage between the electrodes, I is a current between the electrodes, and t is time. In the state at time Ti shown in FIG. 10, voltage is impressed upon between the wire electrode 1a and the workpiece 2. When voltage is impressed between the electrodes, the positive polarity and the negative polarity attract each other by a force of static electricity. By this force of static electricity, the wire electrode 1a, the rigidity of which is low, is drawn onto the side of the workpiece 2. This could be a cause of vibration of the wire electrode 1a. Due to the vibration, it becomes difficult to conduct wire electric discharge machining with high accuracy. In the conventional method of wire electric discharge machining, the above problems may be encountered.

In the state of time T2 shown in FIG. 10, a vaporizing explosion force of the dielectric fluid is generated by the energy of electric discharge, that is, for example, the state of time T2 is the same as that of (c) of FIG. 8. A high intensity of force, the direction of which is opposite to the workpiece 2, acts on the wire electrode 1a by the vaporizing explosion force of the dielectric fluid. By this high intensity of force, vibration is generated in the wire electrode 1a. When the above vibration is generated, irregularities are caused in the profile of the workpiece 2, and the dimensional accuracy is deteriorated.

In the field of semiconductor industry in which wire electric discharge machining is utilized, for example, in the process of machining a metallic mold of an IC lead frame, a very high accuracy of a profile not more than 1 μm and very smooth surface roughness not more than 1 μmRmax are demanded to the workpiece, and further it is necessary to enhance productivity. Especially when wire electric discharge machining is used for the above object, the above problems caused by vibration of the wire electrode are remarkable.

DISCLOSURE OF INVENTION

The present invention has been accomplished to solve the above problems. It is an object of the present invention to provide a method of wire electric discharge machining, the productivity of which is high, which is suitable for highly accurate machining.

The present invention provides a method of wire electric discharge machining by which an electric discharge is generated in a gap between a wire electrode and a workpiece so that the workpiece is machined, comprising the step of machining the workpiece while at least two machining processes in the machining processes of machining in a dielectric fluid, machining in mist and machining in gas are combined with each other.

Also, the present invention provides a method of wire electric discharge machining, in which the machining process is changed over between said machining processes when straightness of the workpiece reaches a predetermined value.

Also, the present invention provides a method of wire electric discharge machining by which an electric discharge is generated in a gap between a wire electrode and a workpiece so that the workpiece is machined, comprising the steps of: a first step in which electric discharge machining is conducted in a dielectric fluid; a second step in which electric discharge machining is conducted in mist; and a third step in which electric discharge machining is conducted in gas.

Also, the present invention provides a method of wire electric discharge machining, in which the machining process is changed over between said machining processes when straightness of the workpiece reaches a predetermined value.

BEST MODE FOR CARRYING OUT THE INVENTION

Figure 1:
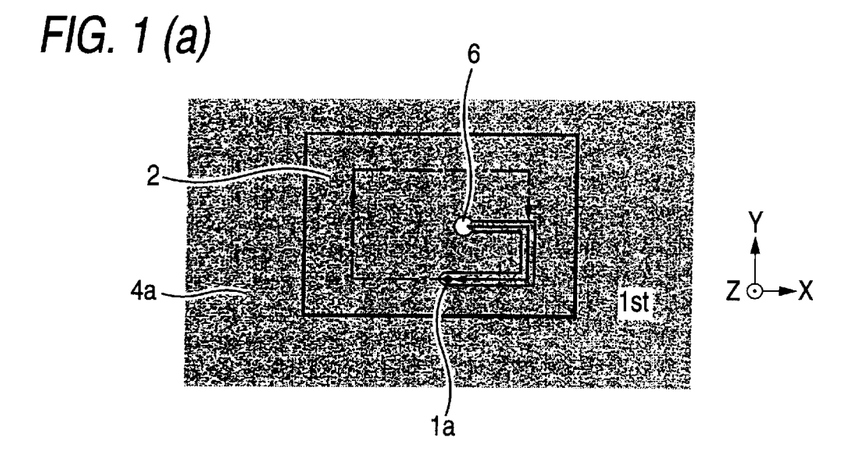
FIGS. 1(A) 1(B) and 1(C) are schematic illustrations showing an example of a method of wire electric discharge machining of an embodiment of the present invention.

FIG. 1 is a schematic illustration showing an example of a method of wire electric discharge machining of an embodiment of the present invention. In FIG. 1, reference numeral 1a is a wire electrode, reference numeral 2 is a workpiece, reference numeral 4a is water which is a dielectric i.e. liquid reference numeral 6 is an initial hole, reference numeral 7 is mist of water, and reference numeral 8 is gas such as air. In FIG. 1, (a) shows a process of first cut which is rough machining, (b) shows a process of second cut which is intermediate finish machining conducted after rough machining, and (c) shows a process of third cut which is final finish processing. The first cut process, second cut process and third cut process are conveniently defined as described above, that is, wire electric discharge machining is not necessarily completed by the above processes conducted three times. In the case of machining which is conducted on a workpiece with low accuracy, machining is completed only by the first cut process, or only by the first and the second cut process. In the case of machining which is conducted on a workpiece with high accuracy, machining is completed by the machining process conducted seven or eight times.

Next, an outline of the method of machining will be explained as follows. In the first cut process shown in (a) of FIG. 1, the wire electrode 1a is made to pass through the initial hole 6, and the workpiece 2 is gouged. In the first cut process, the surface roughness and dimensional accuracy are finally finished in the process conducted later. Therefore, it is unnecessary to machine the workpiece with such a severe surface roughness and high dimensional accuracy in the process of first cut process, but it is important to increase a rate of machining so as to enhance the productivity. In the same manner as that of the background art shown in (a) of FIG. 9, machining is conducted while water 4a, which is a dielectric liquid, is interposed between the electrodes.

In the conventional wire electric discharge machining, even after the first cut process, machining is conducted in the dielectric fluid, however, as described in the background art, problems of vibration of the wire electrode may be encountered. Therefore, the conventional wire electric discharge machining is not suitable for machining to be conducted with high accuracy. The present invention relates to a technique by which accuracy and surface roughness can be improved when finish machining is conducted without interposing a dielectric fluid between the electrodes.

In the second cut process shown in (b) of FIG. 1, which is an intermediate finish machining, in order to improve accuracy of a machining profile by suppressing vibration of the wire electrode 1a, machining is conducted not in the dielectric fluid 4a but in the mist 7. A rate of machining conducted in the mist 7 is by no means inferior to that conducted in the dielectric fluid 4a. In the case of machining conducted in the mist 7, vibration of the wire electrode 1a caused by the electrostatic force is suppressed. Therefore, machining accuracy can be enhanced. Machining in the mist 7 can be conducted by spraying mist to between the wire electrode 1a and the workpiece 2, for example, by a mist supply device not shown in the drawing.

In the third cut process shown in (c) of FIG. 1 which is a final finish machining, electric discharge conducted in the gas 8 is utilized. Therefore, vibration of the wire electrode 1a can be further suppressed. Machining in the gas 8 can be conducted in atmospheric air, or alternatively machining in the gas 8 can be conducted while gas of a predetermined composition is sprayed to between the wire electrode 1a and the workpiece 2 by a gas supply device not shown in the drawing.

The reason why electric discharge machining can be conducted with high accuracy in the mist 7 and the gas 8 is described as follows. When voltage is impressed upon between the electrodes, an intensity of the static electric force acting on the wire electrode 1a and the workpiece 2 is proportional to the dielectric constant between the electrodes. Therefore, when distances between the electrodes are the same, compared with a case in which the water 4a is interposed between the electrodes, the intensity of electrostatic force is decreased to one several tenth in the case where the mist 7 or the gas 8 is interposed between the electrodes. (For example, the dielectric constant is lowest in vacuum. In water, the dielectric constant is approximately eighty times as high as that in vacuum.) Since a vaporizing explosion force caused by electric discharge is generated when liquid exists between the electrodes, the wire electrodes 1*a* is seldom affected by the vaporizing explosion force in the case where only the mist 7 or the gas 8 exists between the electrodes.

Accordingly, when electric discharge is conducted in the mist 7 or the gas 8, it is possible to conduct a highly accurate wire electric discharge machining.

Figure 2:
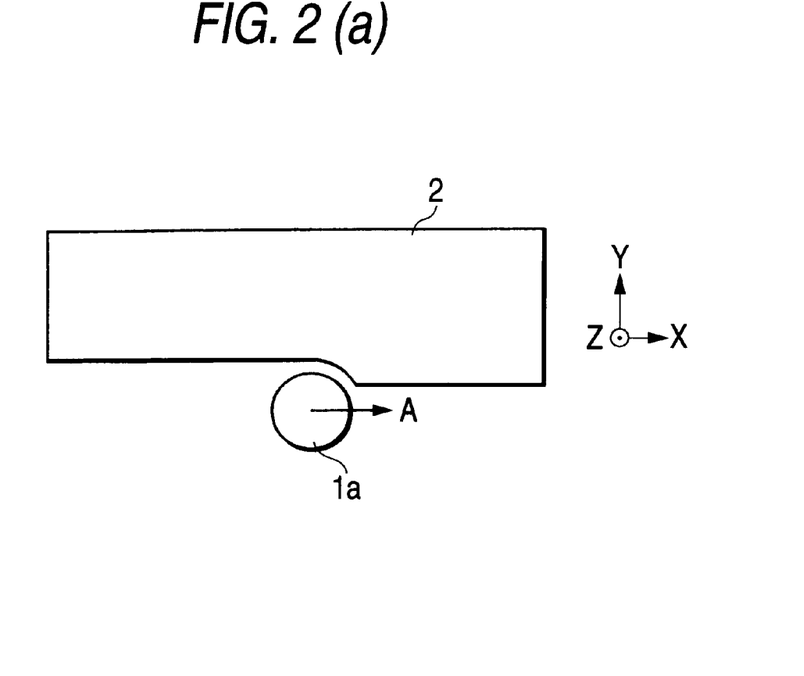
FIGS. 2(A) and 2(B) are schematic illustrations showing a circumstance of wire electric discharge machining conducted in a dielectric fluid.
Figure 3:
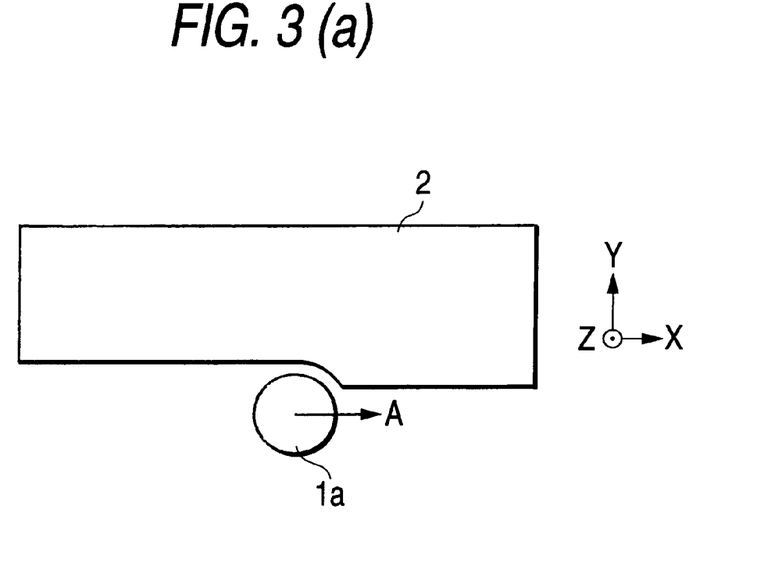
FIGS. 3(A) and 3(B) are schematic illustrations showing a circumstance of wire electric discharge machining conducted in mist or gas.

FIG. 2 is a schematic illustration showing a circumstance of wire electric discharge machining conducted in the dielectric fluid 4*a*, and FIG. 3 is a schematic illustration showing a circumstance of wire electric discharge machining conducted in the mist 7 or the gas 8. In the drawing, reference numeral 1*a* is a wire electrode, reference numeral 2 is a workpiece, and reference mark A is a direction of proceeding. When the workpiece 2 is machined, the wire electrode 1*a* proceeds in the proceeding direction A.

In the example shown in FIG. 2 in which wire electric discharge machining is conducted in the dielectric fluid 4*a*, the wire electrode 1*a* is strongly affected by the viscosity of the dielectric fluid 4*a*. Therefore, as shown in FIG. 2(*b*), when the wire electrode 1*a* is viewed in the direction Y, the wire electrode 1*a* is bent in such a manner that it protrudes in a direction opposite to the proceeding direction A, that is, it protrudes in the direction of arrow B in the drawing. This phenomenon corresponds to the delay of response in the case of controlling a distance between the electrodes. In the case where this phenomenon, in which the wire electrode 1*a* is bent, occurs, it is impossible to quickly control the distance between the electrodes. Due to the above delay of pursuit of the wire electrode, a short-circuit tends to occur between the wire electrode 1*a* and the workpiece 2. Therefore, in order to prevent the short-circuit, it is common that the feed speed of the wire electrode 1*a* is delayed, that is, finish machining is actually conducted at a machining speed lower than the machining speed determined by the performance of an electric power source. On the other hand, in the example shown in FIG. 3 in which wire electric discharge is conducted in the mist 7 or the gas 8, the wire electrode is not affected by the viscosity of the dielectric fluid. Therefore, it is possible to control a distance between the electrodes at high response. Accordingly, the machining speed can be increased in the finish machining.

Figure 4:
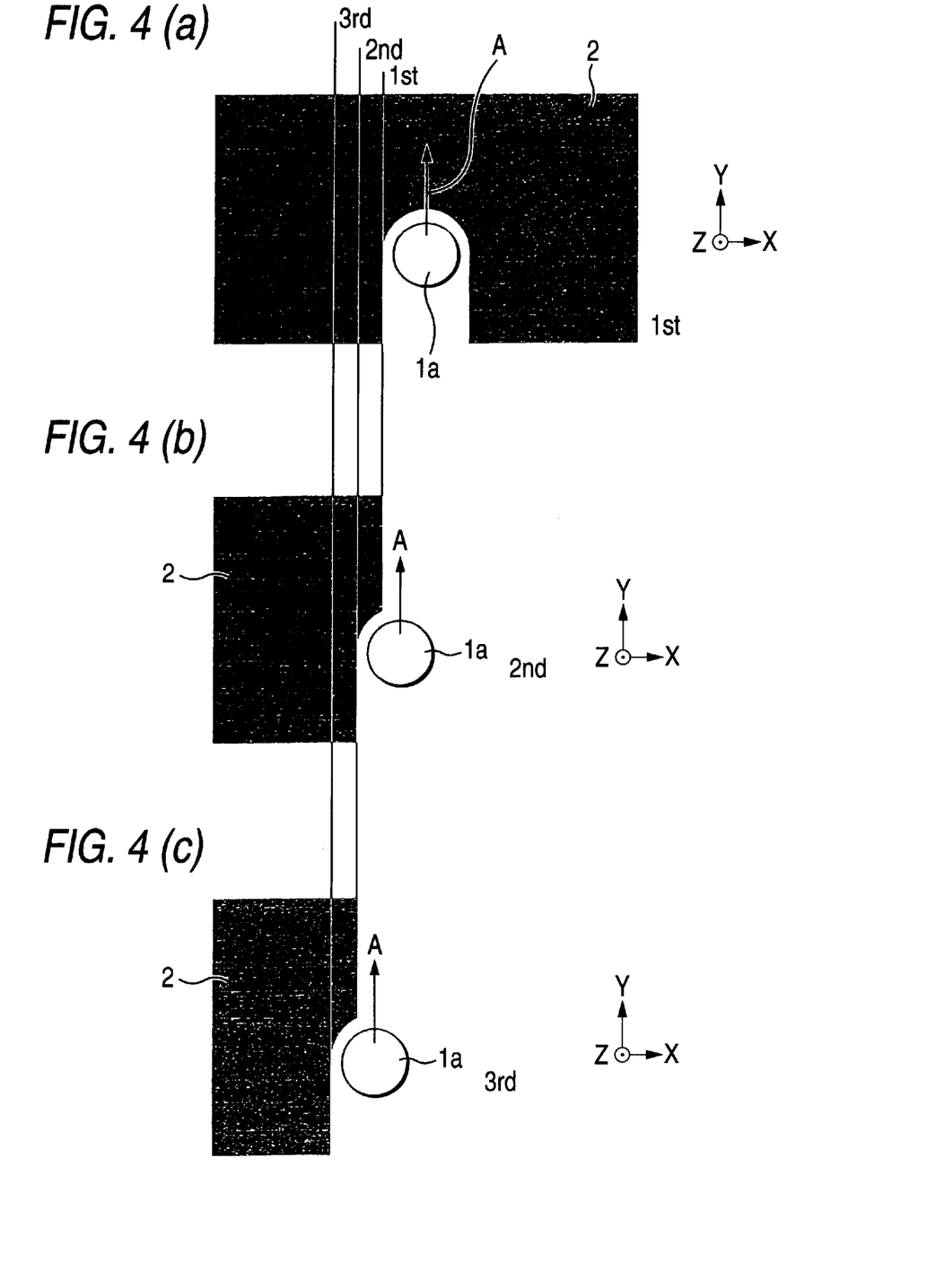
FIGS. 4(A) 4(B) and 4(C) are schematic illustrations showing a quantity of traverse of a wire electrode in the process of wire electric discharge machining.

Further, wire electric discharge conducted in the mist 7 or the gas 8 is advantageous in that an allowable range of a quantity of traverse of the wire electrode at each machining condition can be extended. FIG. 4 is a schematic illustration for explaining a quantity of traverse (In this case, a quantity of traverse is defined as a quantity of shift of the wire electrode when the wire electrode is successively shifted onto the workpiece side according to the frequency of machining.) of the wire electrode in the process of wire electric discharge machining. In FIG. 4, (a) shows the first cut process, (b) shows the second cut process, and (c) shows the third cut process. In FIG. 4, reference numeral 1*a* is a wire electrode, reference numeral 2 is a workpiece, and reference mark A is a proceeding direction of machining. (A is a relatively moving direction of the wire electrode 1*a* with respect to the workpiece 2.) The quantity of traverse is determined by a quantity of machining in a certain machining condition. However, the quantity of machining in a certain machining condition greatly changes according to a feed speed of the wire electrode and a finishing state of the pre-condition. Therefore, concerning the machining condition of wire electric discharge machining, it is necessary to use a row of conditions of the quantity of traverse of the wire electrode and the feed speed of the wire electrode which are selected from the results of various tests of machining. This shows lack of adaptability. For example, when a quantity of machining is a little small and it is necessary to additionally conduct machining, it is difficult to conduct machining appropriately.

Figure 5:
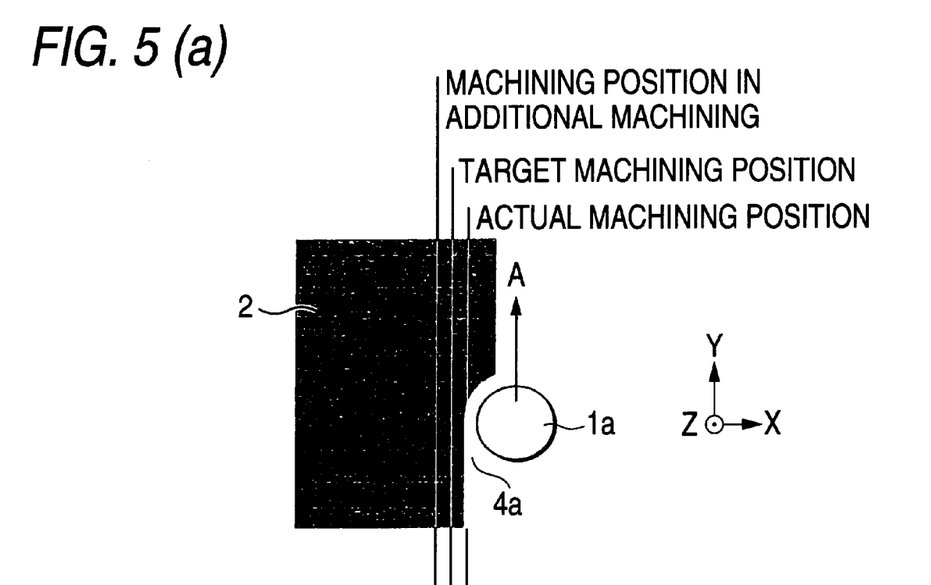
FIGS. 5(A) and 5(B) are schematic illustrations showing an example of wire electric discharge machining conducted in a dielectric fluid.

FIG. 5 is a schematic illustration showing an example of wire electric discharge machining conducted in a dielectric fluid. In FIG. 5, reference numeral 1*a* is a wire electrode, reference numeral 2 is a workpiece, and reference mark A is a proceeding direction of machining. In FIG. 5, (a) shows a circumstance of machining conducted in the final finishing condition. It is a target to conduct machining to a target machining position. However, the result of an actual machining is different from the target. In the example shown in (a) of FIG. 5, a quantity of machining is a little smaller than the target quantity of machining. For example, when a difference between the target machining position and the actual machining position is 2 $\mu$m, they tend to think that when an additional machining is conducted in such a manner that the wire electrode 1*a* is drawn to the workpiece 2 side by 2 $\mu$m, it becomes possible to machine the workpiece to the target machining position. Actually, in many cases, it is impossible to machine the workpiece to the target machining position because a state of the machined surface and a feed speed of the wire electrode in the case of previous finish machining are different from those of the additional machining. For example, as shown in (b) of FIG. 5, a difference is caused between the machining position of additional machining and the target machining position.

Figure 6:
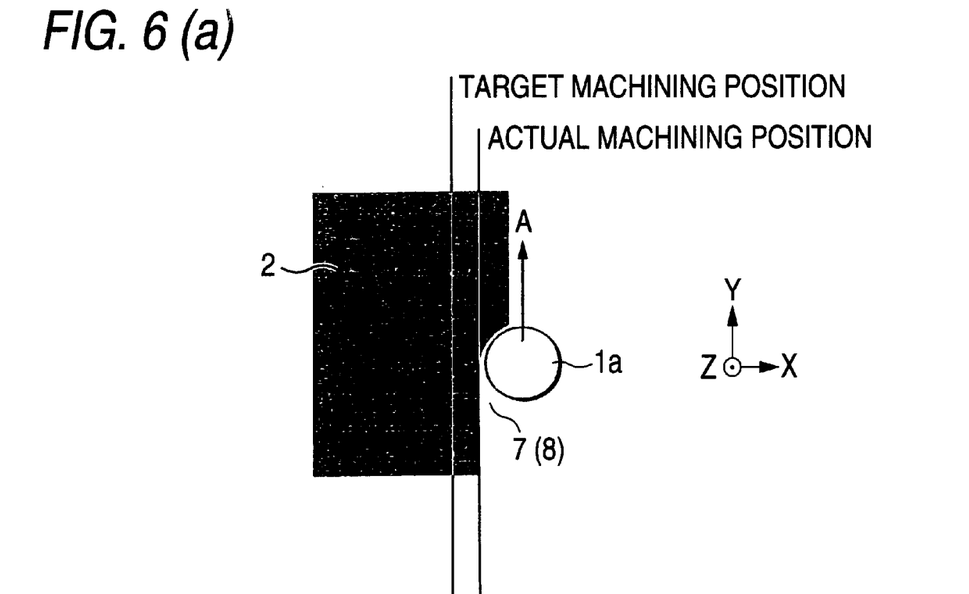
FIGS. 6(A) and 6(B) are schematic illustrations showing an example of wire electric discharge machining conducted in mist or gas.

FIG. 6 is a schematic illustration showing an example of wire electric discharge machining conducted in the mist or gas. In the drawing, reference numeral 1*a* is a wire electrode, reference numeral 2 is a workpiece, and reference mark A is a proceeding direction of machining. In the case of conducting the same machining as that shown in FIG. 5, when an additional machining shown in (b) of FIG. 6 is conducted in the mist or gas, it is possible to conduct machining, the acquired machining size of which is closer to the target size, because the electric discharge gap "g" is so small. Therefore, this electric discharge machining is suitable for a highly accurate machining. The reason why this electric discharge machining is suitable for a highly accurate machining is described as follows. In order to conduct machining with high dimensional accuracy, it is necessary to conduct machining in a suitable condition of surface roughness before machining, in a suitable machining condition and in a condition conforming to the moving speed of the wire electrode. In this case, the smaller the electric discharge gap "g", the smaller the error when these conditions are different. Accordingly, in a series of processes from the rough machining process to the finish machining process, not only a workpiece can be machined to a target profile but also a profile can be simply corrected by an additional machining even when the profile and size deviate from the target.

As described above, it is apparently effective to conduct wire electric discharge machining in the mist or gas in the process of finish machining. Concerning the disadvantage of wire electric discharge machining conducted in the gas 8, the machining speed is lower than that of wire electric discharge machining conducted in the dielectric fluid i.e. liquid. The main reason why the machining speed is lower than that of wire electric discharge machining conducted in the dielectric fluid is described as follows. Since a vaporizing explosion force of the dielectric fluid, i.e. fluid, is not generated by electric discharge, a quantity of removal of the workpiece is decreased.

Accordingly, when machining in a dielectric liquid, machining in mist and machining in gas are combined with each other in accordance with the productivity and the required accuracy for a workpiece, it becomes possible to appropriately meet the requirements.

When consideration is given to the productivity in the case of use in which a highly accurate machining is required, it is effective to conduct machining in a dielectric liquid in the process of rough machining in which a high machining speed is demanded, and it is effective to successively conduct the finish machining in mist and gas.

In this case, the time when machining in a dielectric liquid is changed over to machining in mist (for example, when (a) in FIG. 1 is changed over to (b)) and also the time when machining in mist is changed over to machining in gas (for example, when (b) in FIG. 1 is changed over to (c)) are problems to be solved.

Figure 7:
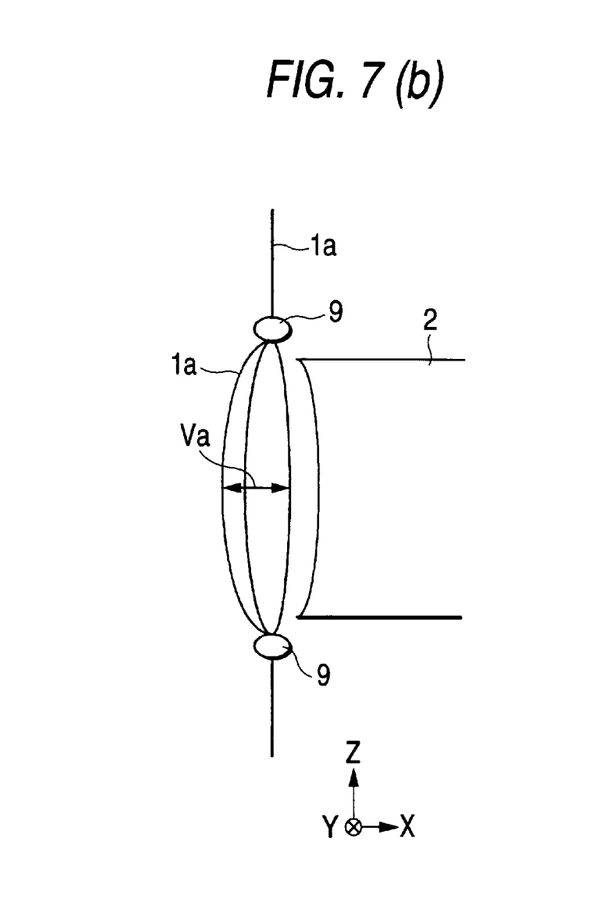
FIGS. 7(A) and 7(B) are schematic illustrations for explaining a profile of a workpiece in the process of electric discharge machining conducted in a dielectric fluid.

FIG. 7 is a schematic illustration for explaining a machining profile of a workpiece in the process of electric discharge machining conducted in a dielectric fluid i.e. liquid. In the drawing, reference numeral 1a is a wire electrode, reference numeral 2 is a workpiece, reference numeral 9 is a wire guide, and reference mark va is an amplitude of vibration of the wire electrode 1a. In the process of rough machining, it is necessary to conduct machining at high machining speed. Therefore, rough machining is conducted in a dielectric fluid in which the workpiece can be machined at high machining speed. However, when machining is conducted in the dielectric fluid, the wire electrode 1a is given a high intensity of resiliency. Therefore, the workpiece 2 is formed into a convex as shown in (a) of FIG. 7, or the workpiece 2 is formed into a concave as shown in (b) of FIG. 7. For example, in the case where a reference voltage of servo between the electrodes is low, a gap formed between the electrodes becomes small and the frequency of electric discharge is increased. Therefore, a relatively high intensity of resiliency acts on the wire electrode 1a. Accordingly, a neutral line of vibration of the wire electrode is curved in a direction opposite to the workpiece, and a convex cutting plane can be provided (shown in (a) of FIG. 7). In the case where a reference voltage of servo between the electrodes is high, a gap formed between the electrodes becomes large and the frequency of electric discharge is decreased. Therefore, a relatively low intensity of resiliency acts on the wire electrode 1a. Accordingly, a neutral line of vibration of the wire electrode is curved a little, and a concave cutting plane can be provided (shown in (b) of FIG. 7).

Concerning the machining conducted in a dielectric fluid, the wire electrode 1a is greatly vibrated in the process of rough machining in which an intensity of electric discharge energy inputted into between the electrodes is high. Therefore, irregularities of the workpiece 2 are increased. When an intensity of electric discharge energy inputted into between the electrodes is reduced, irregularities of the workpiece 2 are decreased, and straightness of the workpiece 2 is increased. When machining is transferred into machining conducted in the mist 7 or the gas 8 while irregularities of the workpiece 2 is large, only the protruding portions of the workpiece 2 are machined. Therefore, the efficiency of machining is deteriorated, and further the surface roughness becomes uneven. Accordingly, it is preferable that after a relatively high straightness has been acquired in the process of machining conducted in a dielectric liquid, the process of machining conducted in a dielectric liquid is transferred into the process of machining conducted in the mist 7 or the gas 8.

Time at which the process of machining conducted in a dielectric liquid is transferred into the process of machining conducted in the mist 7 or the gas 8 can be judged by straightness of the workpiece 2 as follows. Whether or not straightness of the workpiece 2 has reached a predetermined value is judged by a real time measurement conducted in the process of machining or judged by data corresponding to the machining condition which has previously been found by experiments. When straightness of the workpiece 2 has reached the predetermined value, machining may be transferred from machining conducted in the dielectric liquid 4a into machining conducted in the mist 7 or the gas 8.

Time at which machining is transferred from machining conducted in the mist 7 into machining conducted in the gas 8 can be determined in the same manner by judging whether or not straightness of the workpiece 2 has reached the predetermined value.

The method of electric discharge machining of the present invention is composed as described above. Therefore, it is possible to provide a method of wire electric discharge machining, the productivity of which is high, suitable for highly accurate machining.

INDUSTRIAL APPLICABILITY

As described above, the method of wire electric discharge machining of the present invention is suitably used for a highly accurate electric discharge machining work.

What is claimed is:

1. A method of wire electric discharge machining in which an electric discharge is generated in a gap between a wire electrode and a workpiece to machine the workpiece, the method comprising the step of:

machining the workpiece using a combination of at least two machining processes selected from machining in a liquid machining in mist and machining in gas,     wherein the machining process is changed over between the machining processes when straightness of the workpiece reaches a predetermined value.

2. A method of wire electric discharge machining by which an electric discharge is generated in a gap between a wire electrode and a workpiece so as to machine the workpiece, the method comprising the steps of:

a first step of conducting electric discharge machining in a dielectric liquid;

a second step of conducting electric discharge machining in mist; and     a third step of conducting electric discharge machining in gas.

3. A method of wire electric discharge machining according to claim 2, wherein the machining process is changed over between the machining processes when straightness of the workpiece reaches a predetermined value.

* * * * *